(12) United States Patent
Delsman et al.

(10) Patent No.: US 12,026,143 B2
(45) Date of Patent: Jul. 2, 2024

(54) VIRTUAL STORAGE CONTAINER FOR DATA STORAGE AND ARCHIVING

(71) Applicant: FALCONSTOR, INC., Austin, TX (US)

(72) Inventors: Mark Delsman, Monte Sereno, CA (US); Hsin-Hui Wu, Jericho, NY (US)

(73) Assignee: FALCONSTOR, INC., Austin, TX (US)

( * ) Notice: Subject to any disclaimer, the term of this patent is extended or adjusted under 35 U.S.C. 154(b) by 0 days.

(21) Appl. No.: 17/187,165

(22) Filed: Feb. 26, 2021

(65) Prior Publication Data

US 2021/0271657 A1   Sep. 2, 2021

Related U.S. Application Data

(60) Provisional application No. 63/100,115, filed on Feb. 27, 2020.

(51) Int. Cl.
*G06F 16/22* (2019.01)
*G06F 16/174* (2019.01)
(Continued)

(52) U.S. Cl.
CPC ...... *G06F 16/2282* (2019.01); *G06F 16/1748* (2019.01); *G06F 21/53* (2013.01); *G06F 21/602* (2013.01)

(58) Field of Classification Search
CPC .. G06F 16/2282; G06F 16/1748; G06F 21/53; G06F 21/602; G06F 2221/2137; G06F 2221/2143; G06F 21/6218
See application file for complete search history.

(56) References Cited

U.S. PATENT DOCUMENTS

2010/0241619 A1\* 9/2010 Snider ................ G06F 11/1453
707/693
2017/0083558 A1 3/2017 Vijayan et al.
(Continued)

OTHER PUBLICATIONS

Kane, Docker: Up and Running Second Edition, Chapter 5 pp. 1-37; Chapter 11 pp. 1-54, (Year: 2018).\*
(Continued)

*Primary Examiner* — Albert M Phillips, III
(74) *Attorney, Agent, or Firm* — Brandon N. Sklar; The Law Office of Brandon N. Sklar

(57) ABSTRACT

A method of storing data, comprises extracting data from a first storage of a storage system; containerizing the data to form a container image, the container image being self-contained and configured to be moved and stored as a unit; and storing the container image in at least one second storage different from the first storage. The data may be deduplicated data and containerizing may be by an OCI-compliant process, such as Dockerizing. A system and a non-transitory storage medium are also disclosed. A method of storing data also comprises receiving, by a storage system, a container image, the container image being self-contained and including metadata and a data file containing data. The container image is configured to be moved and stored as a unit and is received from a second system separate from the storage system, via a network. The container image is stored by the storage system.

27 Claims, 10 Drawing Sheets

(51) Int. Cl.
*G06F 21/53* (2013.01)
*G06F 21/60* (2013.01)

(56) References Cited

U.S. PATENT DOCUMENTS

| | | | |
|---|---|---|---|
| 2018/0067658 A1* | 3/2018 | Tripathy | G06F 3/0611 |
| 2018/0095973 A1 | 4/2018 | Huang et al. | |
| 2018/0146069 A1 | 5/2018 | Du et al. | |
| 2018/0285199 A1* | 10/2018 | Mitkar | G06F 11/2048 |
| 2018/0285210 A1 | 10/2018 | Mitkar et al. | |
| 2018/0324203 A1* | 11/2018 | Estes | G06F 9/5061 |
| 2020/0034449 A1* | 1/2020 | Gupta | G06F 16/1748 |
| 2020/0057663 A1 | 2/2020 | Abbott et al. | |
| 2020/0341638 A1* | 10/2020 | Anand | G06F 11/1469 |

OTHER PUBLICATIONS

Sun, Tapping the Potential: Secure Chunk-based Deduplication of Encrypted Data for Cloud Backup, pp. 1-9, (Year: 2018).*
Savitha An enhancement to SePeCloud with improved security and efficient data management, pp. S3261-S3269, (Year: 2018).*
Kasireddy, A Beginner-Friendly Introduction to Containers, VMs and Docker, pp. 1-33 (Year: 2016).*
Brown, Explaining Docker Image ID, pp. 1-5 (Year: 2016).*
International Search Report in corresponding International Patent Application No. PCT/US2021/020118 dated Jun. 25, 2021.
Written Opinion in in corresponding International Patent Application No. PCT/US2021/020118 dated Jun. 25, 2021.
"Self-contained Information Retention Format (SIRF) Use Cases and Functional Requirements, Working Draft—Version 0.5a, Sep. 27, 2010" SNIA.
Simic, Sofija, "Docker Image vs Container: The Major Differences", PhoenixNap, Oct. 19, 2019, https://phoenixnap.com/kb/docker-image-vs-container.

* cited by examiner

VIRTUAL STORAGE CONTAINER FOR DATA STORAGE AND ARCHIVING

RELATED APPLICATION

The present application claims the benefit of U.S. Provisional Patent Application No. 63/100,115, which was filed on Feb. 27, 2020, is assigned to the assignee of the present application, and is incorporated by reference herein.

FIELD OF THE INVENTION

Data archiving, and, more particularly, data archiving of data in the form of a container.

BACKGROUND OF THE INVENTION

Virtual tape libraries ("VTLs") have traditionally been used for the backup and restoration of data. Use of a VTL enables consolidation of various backup environments while maintaining existing workflows, faster ingest to meet challenging backup windows, and efficient deduplication across large amounts of data. VTLs are also highly scalable.

FIG. 1 is a schematic representation of an example of a backup system 10 for storing data. The system 10 in this example includes a Virtual Tape Library ("VTL") system 12 to store backup streams of data from local storage 14A—local storage 14N of client 16A—client 16N, respectively. The clients 16A-16N may be large or small organizations or individuals, for example. The backup data streams may be from enterprise software applications that protect data on the client systems 16A-16N, such as enterprise software backup applications from Veritas Technologies, Santa Clara, California; Commvault, Tinton Falls, NJ; Veeam, Baer, Switzerland; and/or IBM Backup, Recovery, & Media Services (BRMS), Armonk, NY, for example. The backup data streams are provided from the local storages 16A-16N by the enterprise software backup applications to the VTL 12 via a network 18, such as a local area network ("LAN") or a wide area network ("WAN"), for example. The VTL system 12 includes a processing device 20 for controlling overall operation of the VTL 12 and a deduplication module 22. Backup data streams received by the VTL 12 via the network 18 are provided to the deduplication module 22 for deduplication.

The deduplication module 22 may comprise a processing device 24 and local storage 26 comprising solid state storage ("SSD") 28 and/or hard disk drive(s) ("HDD") 30, for example. The local storage 26 includes one or more solid-state storage device(s) ("SSD") 28 and/or hard disk drive(s) ("HDD") 30, for example. The VTL 12 emulates a tape drive or library. Random access memory ("RAM") 32 may be provided for storage of a hash table 34. A single instance repository ("SIR") 35 is provided in this example for the storage of deduplicated data. The hash table 34 and/or the SIR may also be provided in the storage 26.

The backup data streams are received by the deduplication module 22 and stored in the local storage 26. The processing device 24 of the deduplication module 22 deduplicates the data stored in the local storage 26 in post-process deduplication. Alternatively, deduplication may be performed by the processing device 24 in in-line deduplication, as the backup data streams are received. After deduplication, virtual tape images of the metadata associated with respective backup data streams are stored in the SSD 28 and/or the HDD 30.

To implement data deduplication, in one example, the received data is divided into data blocks. The data blocks are hashed, resulting in hash values that are smaller than the original blocks of data and that uniquely represent the respective data blocks. A 20 byte SHA-1 hash or MD5 hash may be used, for example. Hash values are stored in the hash table with a pointer to the associated data block, which is stored in the SIR 35. Pointers to all the locations of the same data block are associated with the respective hash value. Each unique data block is stored in the SIR 35. The data blocks on the SSD 28 and/or HDD 30 are replaced by stub files that may include the hash value of the data block being replaced, a pointer to the location of the corresponding hash value in the hash table, and a pointer to a location of the data block stored in the SIR 35. Operation of the processing device 24 or the processing device 20 may be controlled by software, hardware, such as an application specific integrated circuit, or a combination of hardware and software, for example.

A virtual tape of the deduplicated data may be stored in the SIR 35, for example. The virtual tape may be ejected at any time, including when the SIR 35 is full to restore storage space, and when the enterprise software backup application or the client providing the data no longer wants the virtual tape to be mounted in the SIR 35, for example. The data in the virtual tape image is re-hydrated, or restored to its non-deduplicated form, in a manner known in the art, a virtual tape image of the restored data is generated, and the virtual tape image of the restored data is stored on a physical tape 36. The physical tape(s) may be physically transported to an offsite archive (not shown). The virtual tape may also be stored in a local archive 38, which may be directly connected to the VTL, as shown in FIG. 1. The physical tape 36 and/or the local archive 38 may be coupled to the VTL 10 via another network, such as a local area network (LAN), for example. The virtual tape may also be sent to a cloud archive 40, such as Amazon AWS, for example, via the network 18. The deduplicated data may also optionally remain on the SIR 35.

As is known in the art, a virtual tape cloud archive, such as the cloud archive 40, provides up to 99.999999999% infrastructure reliability. The virtual tape cloud archive also decreases the physical movement of the data, the handling costs, and the logistical requirements of physical storage. Multiple virtual tape images may be generated and stored in the same or different archives for redundancy. Local and remote copies may be kept for redundancy and restore options, for example.

SUMMARY OF THE INVENTION

When a virtual tape is ejected from the VTL, it may be rehydrated and converted to a default, industry standard tape image format, such as linear tape-open ("LTO"), for example. The data remains compressed and is optionally encrypted. Rehydrated data, however, loses the size reduction, and therefore the space and size advantages, provided by deduplication. As the backup/restore market has matured, many more regulations have been introduced concerning retention periods and security needs for the long-term archive of the historical data, such as medical and legal records, for example. Long term archiving of data presents unique problems in data preservation and security as the data is susceptible to the separation of related files, data loss, data corruption, damage to a storage site, hacking, and change in or obsolescence of storage hardware, for example.

In accordance with an embodiment of the invention, a method of storing data is disclosed comprising extracting, by a processing device, data from a first storage of a storage system. The extracted data is containerized, by the processing device, to form a container image that is self-contained and configured to be moved and stored as a unit. The container image is stored in at least one second storage different from the first storage. As used herein the term "processing device" may include one or more processing devices. The data may be deduplicated data and containerizing may be by an OCI-compliant process, such as Dockerizing. A system and a non-transitory storage medium are also disclosed.

In accordance with another embodiment, a method of storing data comprises receiving, by a storage system, a container image that is self-contained and includes metadata and a data file containing data. The container image is configured to be moved and stored as a unit and is received from a second system separate from the storage system, via a network. The container image is stored by the storage system. The storage system may be a cloud storage system, for example. The container image may include one or more executable routines and the method may further comprise loading the container image to an executable space to generate a container from the container image and to execute the one or more routines. The one or more executable routines may include a checksum routine and/or a self-destruct routine, for example.

The data may reside in a container image that meets an industry-standard Open Container Initiative ("OCI") format, which is broadly compatible, facilitates portability, and improves longevity of the storage of deduplicated data, for example. Compatibility here means that the data is in a format that can be stored in multiple storage locations by different providers, while portability means that the data is in a format that can be readily moved to a different storage location if the storage location suffers a disaster, is hacked, or the hardware at the location is changed, for example. The container image may also be in a non-OCI compliant format and the data need not be deduplicated.

OCI compliant containers and container images are generally application execution oriented. In accordance with certain embodiments of the invention, in contrast, storage of data, such as deduplicated data, is the primary intent of the container image, with execution as a secondary option. In addition to the data stored in the container image, the container image may include one or more checksums and an executable checksum app, for example. A container image in accordance with embodiments of the invention is also referred to herein as a virtual storage container ("VSC") image.

In accordance with one embodiment of the invention, deduplicated data and associated files may be moved from an SIR of a VTL to a long-term archive in a self-contained container image having a smaller size that the corresponding non-deduplicated data, at a lower cost. A self-contained container image in accordance with certain embodiments of the invention includes all the information needed to store the container image, reconstruct the data in the container image, execute the container image when in the form of a container, if necessary, and return the data to a client, if requested, without external references to other sources of data. In one example, all components of the container image are stored together and moved together and are not stored separately or moved separately.

In one example, a self-contained container image includes the data to be stored and the metadata and other files in the container image include the information needed to perform the functions described above. For example, when the data stored in the container is deduplicated data, the container image includes the information needed to re-hydrate the original data. In other examples, where data integrity is to be verified by a checksum, for example, the container image includes a checksum routine and the checksum to be verified. If the container image is encrypted, the container image may include an encryption key. If the container image is to self-destruct after a period of time, the container image may include a self-destruct timer. When a container image self-destructs, it is expired. It will not, therefore, be retrieved from storage. It may be purged from the storage. In addition, once containerized, the components of the container image are only moved together, as a unit.

In accordance with other embodiments of the invention, data to be placed in the container image may optionally be fragmented (sharded) by an erasure coding operation, for example, to further limit the size of redundant copies and for robustness of the data. Container images resulting from sharded files may be stored across different data centers or cloud repositories to further support a robust and high-available storage solution. The container images needed to reconstruct the data may be retrieved from the least expensive storage locations, reducing costs. Execution of a data integrity check by a routine in a container image may decrease or eliminate cloud egress charges for data validation.

DETAILED DESCRIPTION OF EMBODIMENTS

In accordance with an embodiment of the invention, data, such as deduplicated data or non-deduplicated data, is containerized by a VTL to form a self-contained container image, which is ejected to one or more long-term archives. The VTL is also referred to herein as a virtual container library ("VCL") because the VCL generates container images of stored deduplicated data. In one example, the data to be containerized is a deduplicated data stream that is ejected from the VCL and is containerized to form a Docker container image. Deduplicated or non-deduplicated data from other sources may also be containerized and other containerization processes may be used, in accordance with embodiments of the invention.

In the case of deduplicated data, since the container image is smaller than the corresponding non-deduplicated data, it can be stored at lower cost. The smaller size of the container image also enables shorter transmission times to and from the archives, which may be offsite or in the cloud. In addition, the container structure provides broad compatibility across local and cloud object stores. Container images may be sent to one or more archives, such as one or more cloud archives, for example.

The data may be sharded prior to forming the container image by erasure coding, for example. The data or the data and other files in the container image may also be encrypted prior to forming the container image. Checksums may be created and placed in a checksum file for containerization with the deduplicated data. A self-destruct file may be included in the container to destroy the container image after a predetermined period of time.

Figure 1:
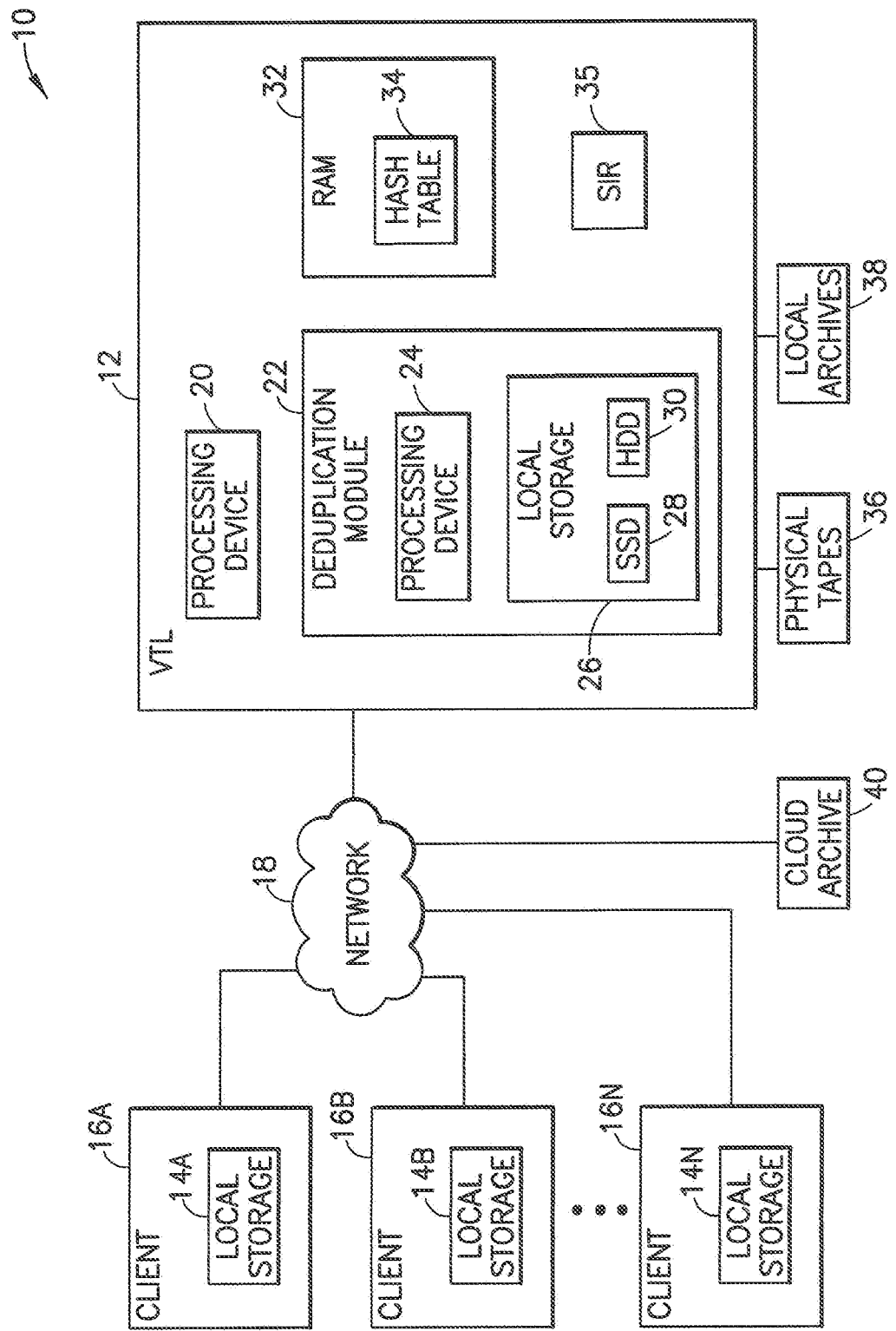
FIG. 1 is a block diagram of an example of a virtual tape library ("VTL") system.
Figure 2:
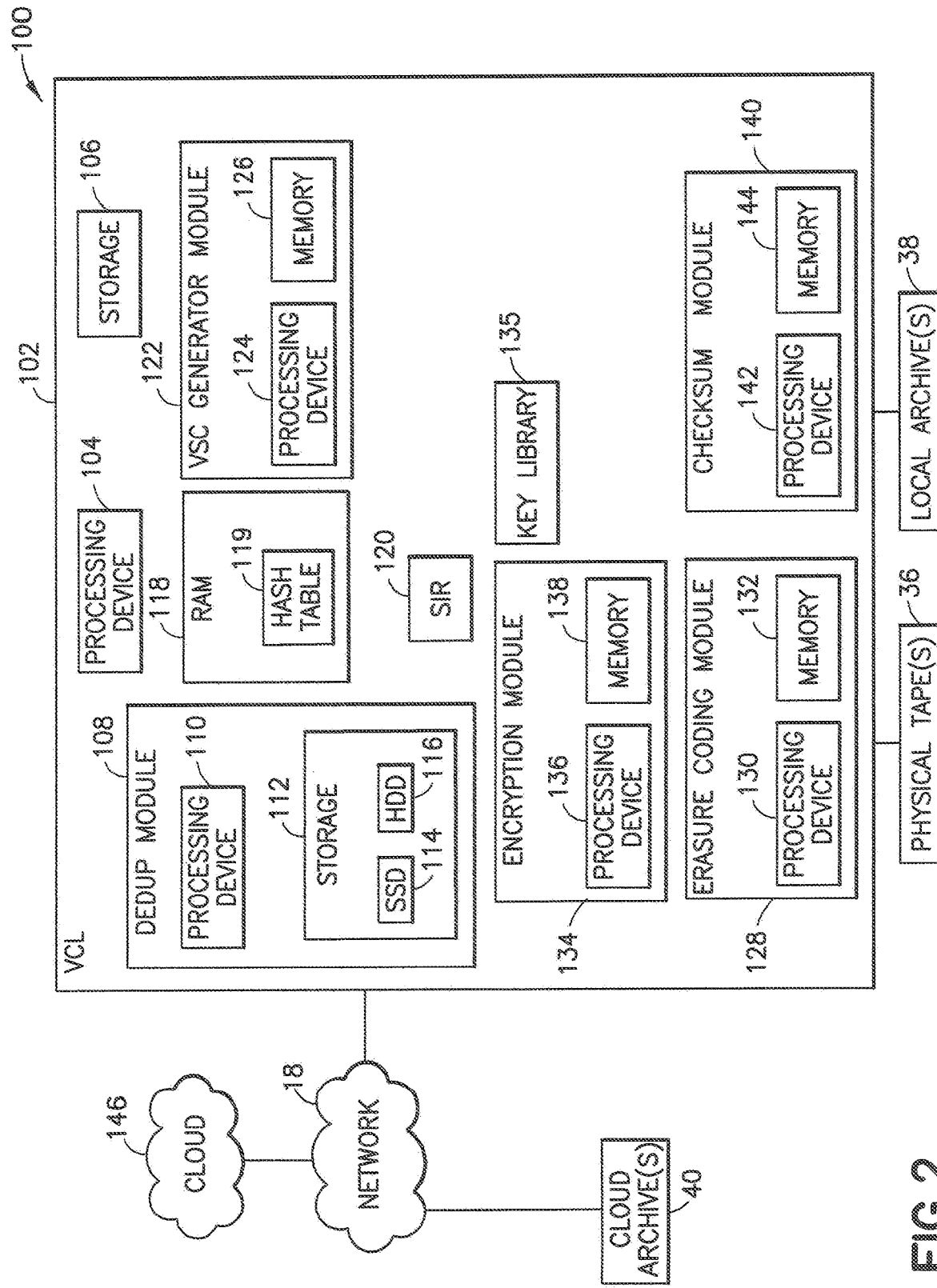
FIG. 2 is a block diagram of an example of a VCL ("virtual container library") system, in accordance with an embodiment of the invention.

FIG. 2 is a schematic representation of an example of a containerization system 100 for containerizing and storing data, in accordance with an embodiment of the invention. The containerization system 100 includes a VCL 102. Components common to FIG. 1 are commonly numbered. The clients 16A-16N of FIG. 1, which provide backup data streams to the VCL 102, are not shown in FIG. 2 for ease of illustration. The VCL 102 includes a processing device 104 to control operation of the VCL 102. As used herein, the term "a processing device" refers to one or more processing devices.

Storage 106 is provided to store the software for controlling the processing device 104 and to store data being processed, for example, and optionally for controlling other components of the VCL 102. The processing device 104 may be a computer, a server, a microprocessor, an appliance, or other programmable processing device, for example.

The VCL 102 includes a deduplication module 108 for deduplicating the received backup data streams, as discussed above with respect to FIG. 1. The deduplication module 108 in this example includes a processing device 110 and storage 112. The storage 112 includes at least one SSD 114 and/or at least one HDD 116. As above, the SSD 114 and/or the HDD 116 may store backup data streams prior to deduplication in post-process deduplication. After deduplication, the SSD 114 and/or the HDD 116 store virtual tape images of the metadata for respective backup data streams. The VCL 102 in this example includes RAM 118 storing a hash table 119 correlating hash values with data blocks and storage, such as an SIR 120, for the storage of deduplicated data, as in FIG. 1. Alternatively, the hash table 119 and/or the SIR 120 may be part of the storage 112 or may be other storage.

The processing device 110 may be a computer, microprocessor, or other programmable processing device, for example. While in this example the deduplication module 108 includes a processing device 110, in other examples, the processing device 110 need not be provided. Alternative configurations are discussed below. Software for controlling the operation of the processing device 110 may be stored in the local storage 112, such as the HDD 116, for example.

Deduplication may be performed on incoming enterprise backup data streams and other backup data streams from the client devices 16A-16N (not shown in FIG. 2) as they are received or after they are stored in the SSD 114 or the HDD 116. Deduplication functionality may be performed by the deduplication module 108 by any technique known in the art. In one example, the data received from enterprise applications of client devices, such as the client devices 16A-16N of FIG. 1, are stored in the SSD 114 and/or HDD 116. The data is divided into data blocks, or segments of data, by the processing device 110. The processing device 110 reads each data block and computes a message digest or digital fingerprint, such as a hash value, of each data block. As used herein, the term "message digest" refers to any type of representation of a data block that is smaller than the original data block and uniquely represents the data block. Hash values may be generated by substantially collision free algorithms that generate a probabilistically unique hash value based on inputted data. Examples of substantially collision free algorithms are the SHA-1 algorithm and the MD5 (message digest 5) algorithm, as discussed above. Either algorithm or other algorithms may be used. The use of hash values is described in U.S. Pat. Nos. 7,962,499, 7,055,008, U.S. Patent Publication No. 2007/0198659, U.S. Patent Publication No. 2006/0218638, and U.S. Patent Publication No. 2012/0089578 A1, for example, which are assigned to the assignee of the present invention and are incorporated by reference herein. The remainder of the discussion will refer to the computation of hash values by a substantially collision free algorithm.

As a hash value is computed for each data block in the SSD 114 and/or the HDD 116, the hash value is compared to hash values stored in the hash table 119. If the hash value is present, then an identical data block has already been hashed and stored in the SIR 120. The data block in the SSD 114 or the HDD 116 is then replaced by a stub file containing a pointer to the hash value in the hash table 114. The data block is then deleted, reducing storage requirements. The hash value in the hash table has a pointer to the unique data block stored the SIR 116. A pointer to the location in the SIR 116 may also be provided.

If the hash value for the data block is not present, then an identical data block has not already been processed by the deduplication module 108. The data block is then added to the SIR 120, the hash value is added to the hash table 119 with a pointer to the location of the data block in the SIR, and the data block in the SSD 114/HDD 116 is replaced by a stub file including a pointer to the hash value in the hash table 114. A pointer to the location in the SIR 116 may also be provided. Since only one copy of a data block is stored by the deduplication module 108, storage requirements of the deduplication module are reduced.

In accordance with an embodiment of the invention, the VCL 102 further includes a virtual storage container ("VSC") generator module 122 configured to compile a self-contained virtual storage container (or "container") image such as a Docker or other OCI compliant container image, for example, that includes the deduplicated data. In one example, containerization by the VSC generator module 122 is performed on deduplicated data when the SIR 120 is full or near full, or the retention period for the virtual tape image of the deduplicated data has ended, and the virtual tape image is ejected from the SIR 120 or other such storage for physical and/or virtual archival storage.

In other examples, other types of data may be containerized by the VSC generator module 122, such as non-deduplicated data. The VSC generator module 122 in the example of FIG. 2 comprises a processing device 124 and memory 126. The processing device 104 may be configured to cause data to be sent to the VSC generator module 122 from the SIR 120 or to cause data to be retrieved by the VSC generator module. The containerization process is described in more detail below with respect to FIG. 3, for example. The processing device 110 may be a computer, microprocessor, an appliance, or other programmable processing device, for example. Other configurations are discussed below.

The VCL 102 may also include an erasure coding module 134 to shard deduplicated data into multiple parts prior to containerization by the VSC generator module 122. As is known in the art, erasure coding divides a data file into a set of multiple smaller files containing redundant data. This enables the original data file to be reconstructed from fewer than all of the smaller files, even if one or more of the smaller files have been lost. Due to the redundant data, the total size of the set of multiple smaller files is larger than the original file. An example of an erasure coding algorithm is the Reed Solomon algorithm. Intel Corporation, Santa Clara, California, offers an open-source erasure coding algorithm based on the Reed Solomon algorithm that may be used, for example. Other erasure coding algorithms are known in the art.

In this example, the erasure coding module 128 comprises a processing device 130 and memory 132. The memory 132 includes erasure coding software implementing the Reed Solomon algorithm or other algorithms, for example, for causing the processing device 130 to perform erasure coding.

The VCL 102 may also include an encryption module 128 for encrypting deduplicated data provided by respective clients 16A-16N and/or enterprise applications. The encryption module 128 in this example includes a processing device 130 and memory 132, for example. In one example, the VCL 102 generates an encryption key, such as by the encryption module 128. In another example, the data is encrypted with a user key provided by the party providing the data, or the user may provide input into the generation of the key by the VCL 102. For example, the user may provide a seed value or user-defined string of data, for example. The user key may be stored in random access memory (not shown) in an encryption key library 134, for example. The encryption key library 134 may also be stored in memory 132 of the encryption module 128.

An encryption algorithm, such as AES 256, may be run by the processing device 130 under the control of software stored in the memory 132, to encrypt the data. Encryption may be performed after sharding of the deduplicated data and before containerization. The processing device 104 may be configured to cause the sharded data to be sent from the erasure coding module 128 to the encryption module or to cause the encryption module 134 to retrieve the sharded data from the erasure coding module.

The VCL 102 may also include a checksum module 140 for generating and checking checksums of data to be stored in a VSC image. The value or values of the checksums may be stored in a respective VSC image. The checksums are used to verify the integrity of the data stored in a respective VSC image. The checksum module 140 may also add an executable checksum application to the VSC image to run checksums on the data in the VSC container and to compare the checksums to checksums of the data stored in the VSC container. The checksum module 140 may comprise a processing device 142 and memory 144, for example. The processing device 142 may generate and/or check checksums under the control of software stored in the memory 144, for example.

Figure 10:
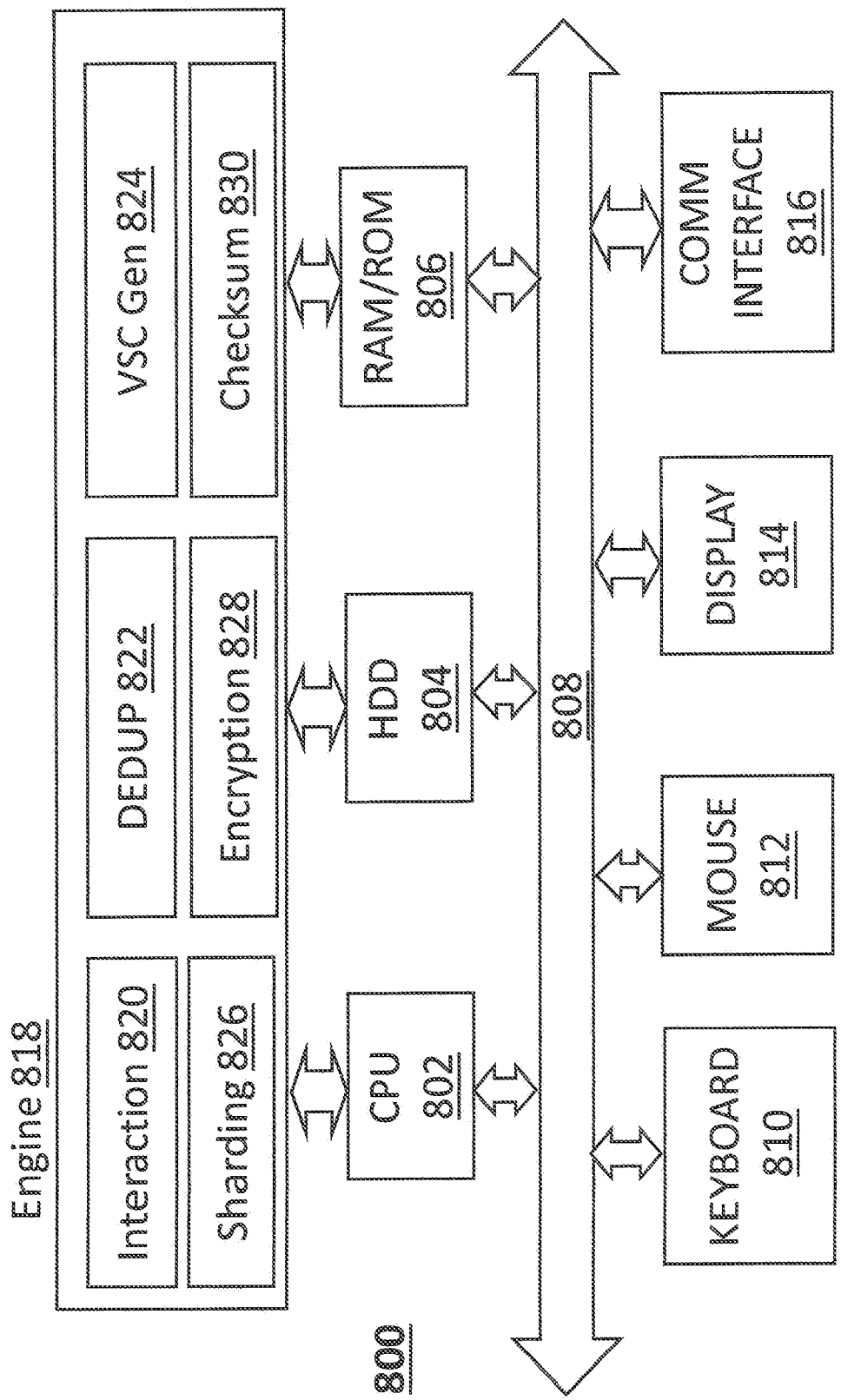
FIG. 10 is an example of a functional block diagram of a VCL, in accordance with an embodiment of the invention.

Any or all the functions described above as being performed by respective processing devices 110, 124, 130, 136, and 142 may be instead performed by the processing device 104 under the control of software stored in the storage 106 or in other locations, as described in more detail below and with respect to the example functional block diagram of FIG. 10, for example. The other processing devices are not, therefore, needed. In other examples, two or more processing devices may be provided that share the functionality of the processing devices 110, 124, 130, 136, and 142. Any or all of the functions of the processing devices 110, 124, 130, 136, and 142 may also be performed in conjunction with the processing device 104. In another example, a different processing device, such as the processing device 110 of the deduplication module 108 may be configured to perform the functions of all or some of the modules 108, 122, 128, 134, and 140. The functions of any or all of the modules 108, 122, 128, 134, 140, may be performed under the control of a combination of software and digital or analog circuitry, or by digital circuitry. An application specific integrated circuit (ASIC) may also be used to provide some or all of the described functionality, for example. In addition, some or all of the processing performed by the VCL 102, including that performed by the processing devices 108, 110, 124, 130, 136, 142, and/or 147 could be performed in the cloud 146. The VCL 102 may also reside in the cloud 146, for example.

Figure 3:
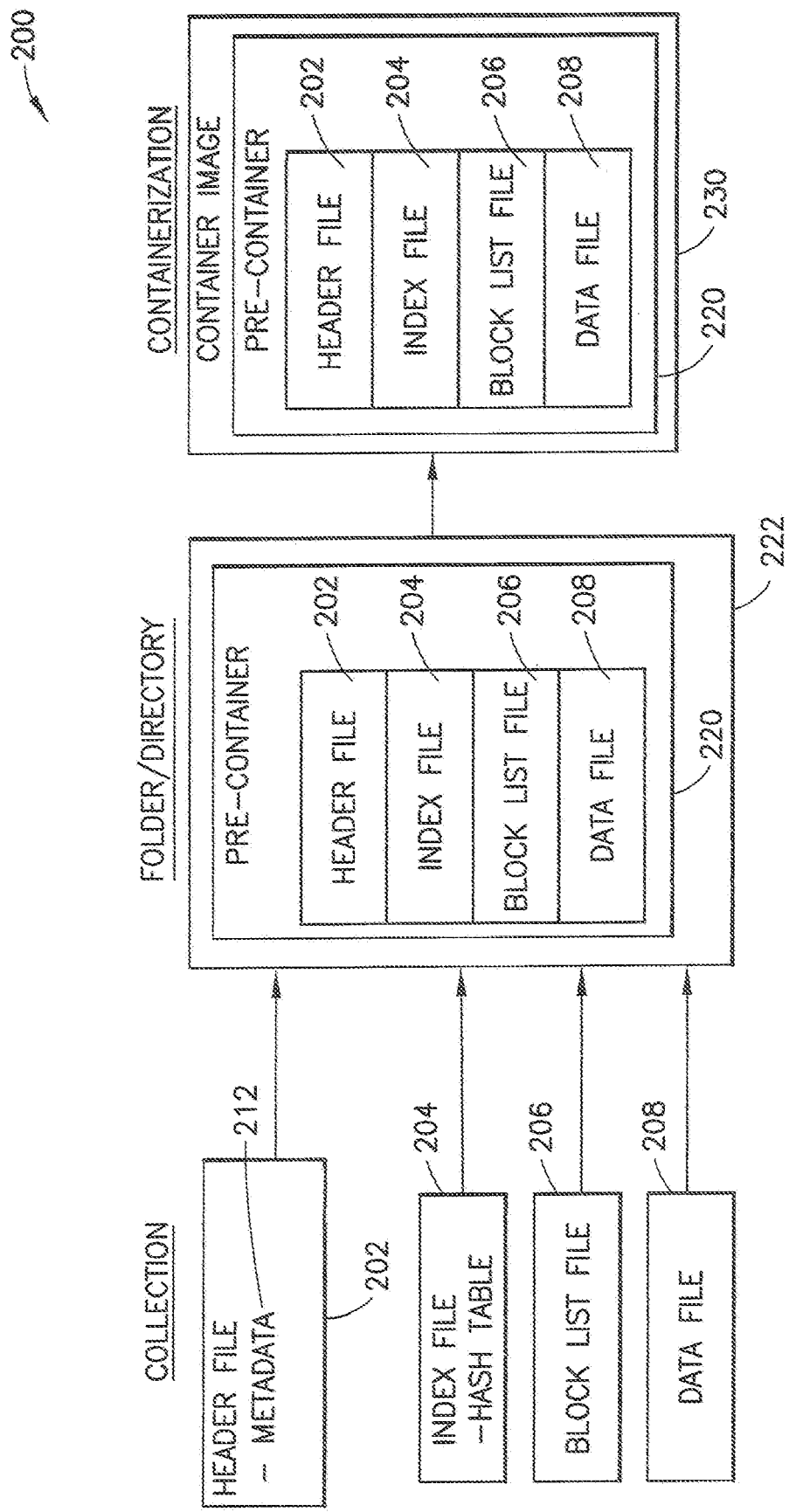
FIG. 3 is a schematic representation of an example of a flow of a process for compiling files to form a container image, in accordance with an embodiment of the invention.

FIG. 3 is a schematic representation of an example of a flow of a process for compiling files to form a container image by the VSC generator module 122, in accordance with an embodiment of the invention. In this example, a header file 212, an index file 204, a block list file 206, and one or more data files 208 containing deduplicated data, are collected. The header file 204 includes metadata 212, including an identification of the VTL 102 that provides the data. The metadata 212 may also include a unique serial code that uniquely identifies the container image and is assigned by the VCL 102 so that the VTL 102 can identify and locate the VSC image after it is sent to storage. The metadata may further include an identification of the client device providing the data, an identification of the files to be included in the container, and access rights, for example. The metadata may be retrieved from the virtual tape images in the SSD 114 and/or HDD 116, or other storage in the VTL 102, for example. The metadata may further include the status of the data in the VSC image as being write once, read many (WORM), if applicable. If a container includes a self-destruct timer, as discussed below with respect to FIG. 6, for example, a time period from creation to destruction may also be stored in the metadata. The order of the files is exemplary. In addition, it is noted that a VSC image in accordance with embodiments of the invention may include different information, or the same information organized in a different way, such as in different files. The VSC image serial code may be correlated with other information, such as the identity of the VCL, the client providing the data, client preferences, where the VSC image is archived, the status of the VSC image, the date of creation of the VSC image, a self-destruct time, if provided, etc., in a database in the storage 108, for example.

The Block list file 206 includes block list data, which is a map defining an order of data blocks in an original backup data stream, such as the original backup data stream received from one of the client devices 16A-16N by the VCL 102. The map in the block list data includes hash values of respective data blocks and location pointers to the data blocks the SIR 120, which are generated as the backup data stream is deduplicated. Block list data for a respective backup data stream is retrieved from the SSD 114 and/or the HDD 118.

The one or more Data files 208 include deduplicated data from the SIR 24. The deduplicated data comprises unique data blocks. The unique data blocks are retrieved from the SIR 120 based on the hash values of the respective data blocks and the location pointers to the respective data blocks.

The Index file 204 includes an index of the data blocks in the Data file 208. As data blocks are retrieved from the SIR 120, index data is generated and placed in the Index file 204. The index data is based on the block list data, with offsets provided to the location pointers to the data blocks in the block list data (which point to locations in the SIR 120) to point to the data blocks in the Data file 208, because the locations of the data blocks change when they are placed in the Data file 208. The original backup data stream may be reconstructed based on the Block list file 206 and the Index file 204.

The Header file 202, the Index file 204, the Block list file 206, and the one or more Data files 208 are collected and maintained in a folder or temporary directory 222 in a Linux file system in one of the memories in the VCL 102, such as the storage 106, the SSD 114, or the HDD 116, for example, as shown in FIG. 3, prior to being compiled (containerized) to form a container image. The collected files are referred to as a pre-container 220. The order of the files in the pre-container 220 in FIG. 3 is exemplary. In addition, it is noted that a pre-container in accordance with embodiments of the invention may include different information, or the same information organized in a different way, such as in different files.

The pre-container 220 is containerized by the VSC generator module 122 to form a container image. FIG. 3 shows a schematic representation of a container 230 containing the pre-container 220 after the files collected in the pre-container are compiled to form a Docker container, another OCI compliant container, or another type of self-contained container, for example, by the VSC generator module 122. Containerization puts the collection of files or other components to be included in the container image in a defined format, such as a Docker format, and maps the components with pointers and linkages so that each component may be located. For example, the VSC generator module 122 may generate a Docker image from the Header file 202, the Index file 204, the Block List Data file 206, and the Data file 208, by using a Docker engine, available from Docker, Inc., San Francisco, California, for example. The Docker image may be generated by using docker command line interface ("CLI") commands, in a manner known in the art. For example, a Docker image may be created with a "docker build" command. A Docker container may be created from a Docker image with a "docker create" command, for execution.

As is known in the art, Docker container images and Docker containers are OCI compliant. OCI compliant containers provide portability and storage longevity, for example. OCI compliant container images are also compatible with multiple cloud and non-cloud storage archives. In this example, the VSC image is read-only, as is a Docker image, and when the VSC image is converted into a container, a read-write container layer is added, also as with a Docker image.

In another example, VSC images 230 in accordance with embodiments of the invention may also be generated by other OCI compliant techniques, such as Containerd, for example. Non-OCI compliant techniques may also be used to generate containers in accordance with embodiments of the invention. Non-OCI compliant containerization techniques may also be used, such as CoreOS rkt, Mesos Containerizer, or LXC Linux Containers, for example, and other processes known in the art. Other containerization processes for generating self-contained containers of desired formats may be created by those of ordinary skill in the art.

As noted above, the Data file(s) 208 need not be deduplicated. For example, if the data stream provided to the VCL 102 by a client device 16A-16N is too small to deduplicate, the data may be stored in the SIR 120 as it is received. It may then be extracted and placed in the folder or temporary directory, along with a Header file 202, to form a pre-container 220. The pre-container 220 including the Header file 202 and one or more Data files 208 may then be compiled to form the container 230, as discussed herein. Since the data is not deduplicated, the Index file 204 and the Block List file 206 are not needed.

Figure 4:
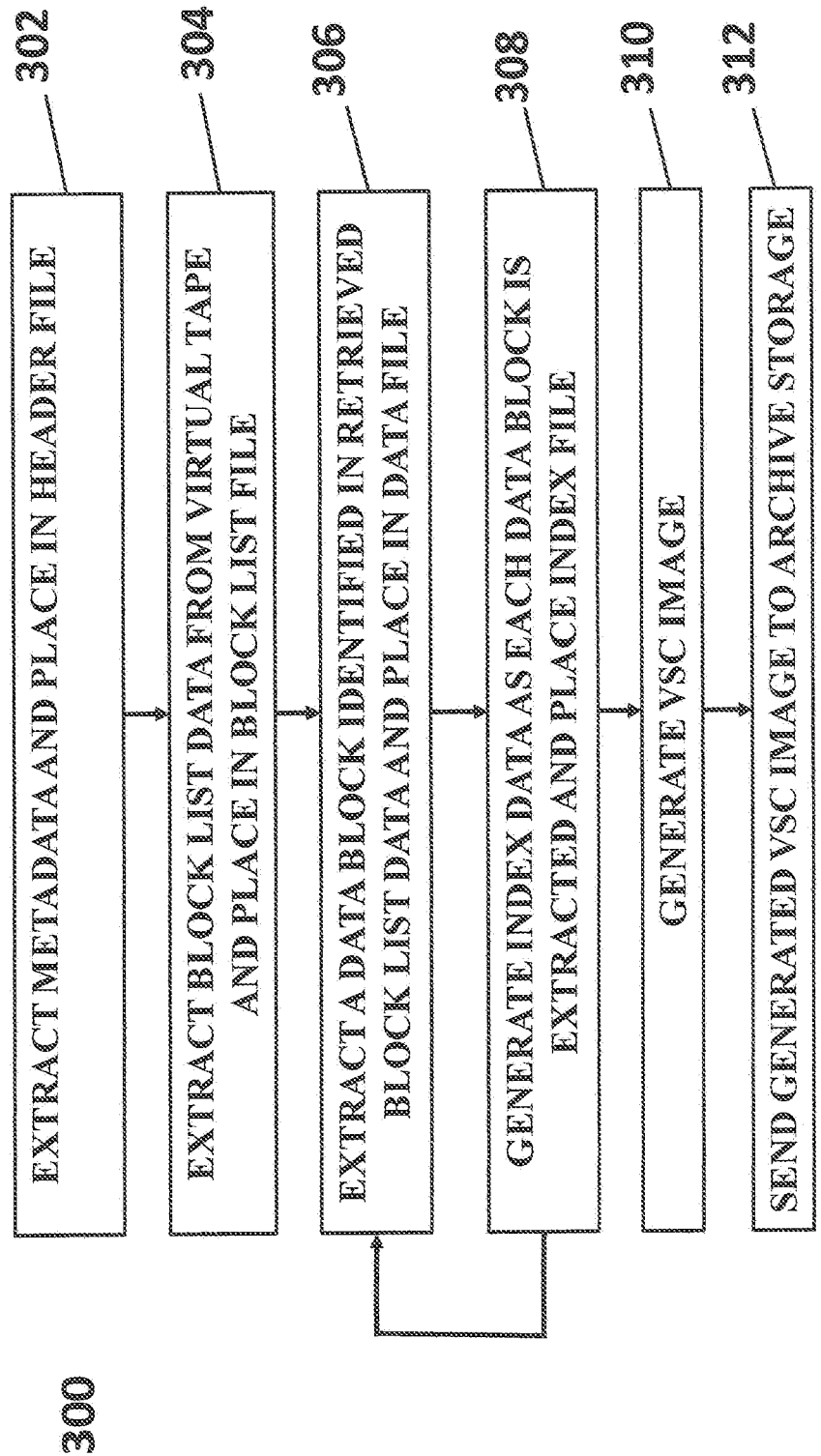
FIG. 4 is a flowchart of an example of a process for compiling files to form a container image, in accordance with an embodiment of the invention.

FIG. 4 is a flowchart 300 of an example of a process for assembling a VSC image 230, in accordance with an embodiment of the invention. Metadata for a set of deduplicated data is extracted from the SIR 120 and from the local storage 112, for example, and placed in a Header file 212, in Step 302. The metadata may be extracted by the processing device 124 of the VSC generator module 122, the processing device 104, or the processing device 110, for example, and provided to the VSC generator module 122. The metadata can be stored in a Header file 202, which may be stored in the folder or in a temporary directory 222 in a Linux file system in the memory 126 or other such memory/storage of the VTL 102, for example. The folder or temporary directory 222 may also be stored in the storage 106, the SSD 110, and/or the HDD 112, or other memory of the VCL 102, for example.

Block list data for a virtual tape of deduplicated data corresponding to the backup data stream to be containerized is retrieved, in Step 304, and placed in the Block list file 206, in Step 304. The virtual tape corresponds to the backup data stream requested by the client, which had been earlier sent by the client for backup, for example. The block list data may be retrieved from the SSD 112 or the HDD 114 by the processing device 110, for example. The block list data may be extracted by the processing device 124 of the VSC generator module 122, the processing device 110, or the processing device 104, for example. The Block List file 206 is be stored in the same folder or temporary directory 222 as the Header file 202.

The data blocks identified in the retrieved block list data is retrieved from the SIR 120, in Step 306, and placed in the Data file 206. The data blocks may be extracted by the processing device 124 of the VSC generator module 122, the processing device 110, or the processing device 104, for example. The Data file 208 is stored in the same folder or temporary directory 222 as the Header file 202.

As each data block is retrieved, in Step 306, index file data is generated, in Step 308, and placed in the Index file 204. Steps 304 and 306 are repeated until each data block is retrieved and index file data is generated for each data block. As discussed above, the index data is based on the block list data, with an offset provided to each pointer in the block list data for the respective retrieved data block, to point to the location of the data block in the Data file 208. The index file data may be generated by the processing device 124 of the VSC generator module 122, the processing device 110, or the processing device 104, for example. The Index file 204 file 206 is stored in the same folder or temporary directory 222 as the Header file 202.

A VSC image 230 in this example is created from the Header file 202, the Index file 204, the Block List Data file 206, and the Data file 208, which are stored together in the folder or temporary directory. The processing device 124 of the VSC generator module 122 generates the container image 230 through a containerization process, such as dockerization, in a manner known in the art, as discussed above.

The generated VSC image 230 in this example is then sent to archive storage. VSC images 230 may be archived in any of the one or more local storage archive(s) 38 and/or any of the one or more cloud archive(s) 40, as discussed further below.

As discussed above, Docker container images and Docker containers are typically executable packages of software that include one or more applications and components needed to run the applications. In this example, the VSC image 230 does not include executable applications or components necessary to execute the applications, although that is an option, as discussed below. Here, the virtual storage container 230 contains data and information needed to store, identify, and reconstruct the data. In other embodiments of the invention, discussed further below, applications related to the stored data, such as a checksum application to verify the integrity of the stored data, or a self-destruct timer to destroy the stored data may be included in the VSC 230 to check the integrity of the data and prevent retrieval of old data, respectively.

As discussed above with respect to FIG. 2, in accordance with other embodiments of the invention, one or more additional functions may be performed on the pre-container 220 of FIG. 3, including the Header file 202, the Index file 204, the Block List file 206, and the one or more Data files 208 of FIG. 3, or to the Header File 202 and one or more Data files 208 if the data is not deduplicated, prior to containerization. For example, the pre-container 220 may be sharded by the erasure coding module 128, the pre-container may be encrypted by the encryption module 134, a checksum file and checksum routine may be added to the pre-container checksum module 140, and/or a timer and a self-destruct routine may be added to the pre-container. The sharding and encrypting are optional processes performed on the data prior to containerization by the VSC generator module 122. The checksum routine and self-destruct routine are embedded in the container image for execution at a later time. The checksum and self-destruct routines are examples of how the container can execute on its contents, as discussed above.

Figure 5:
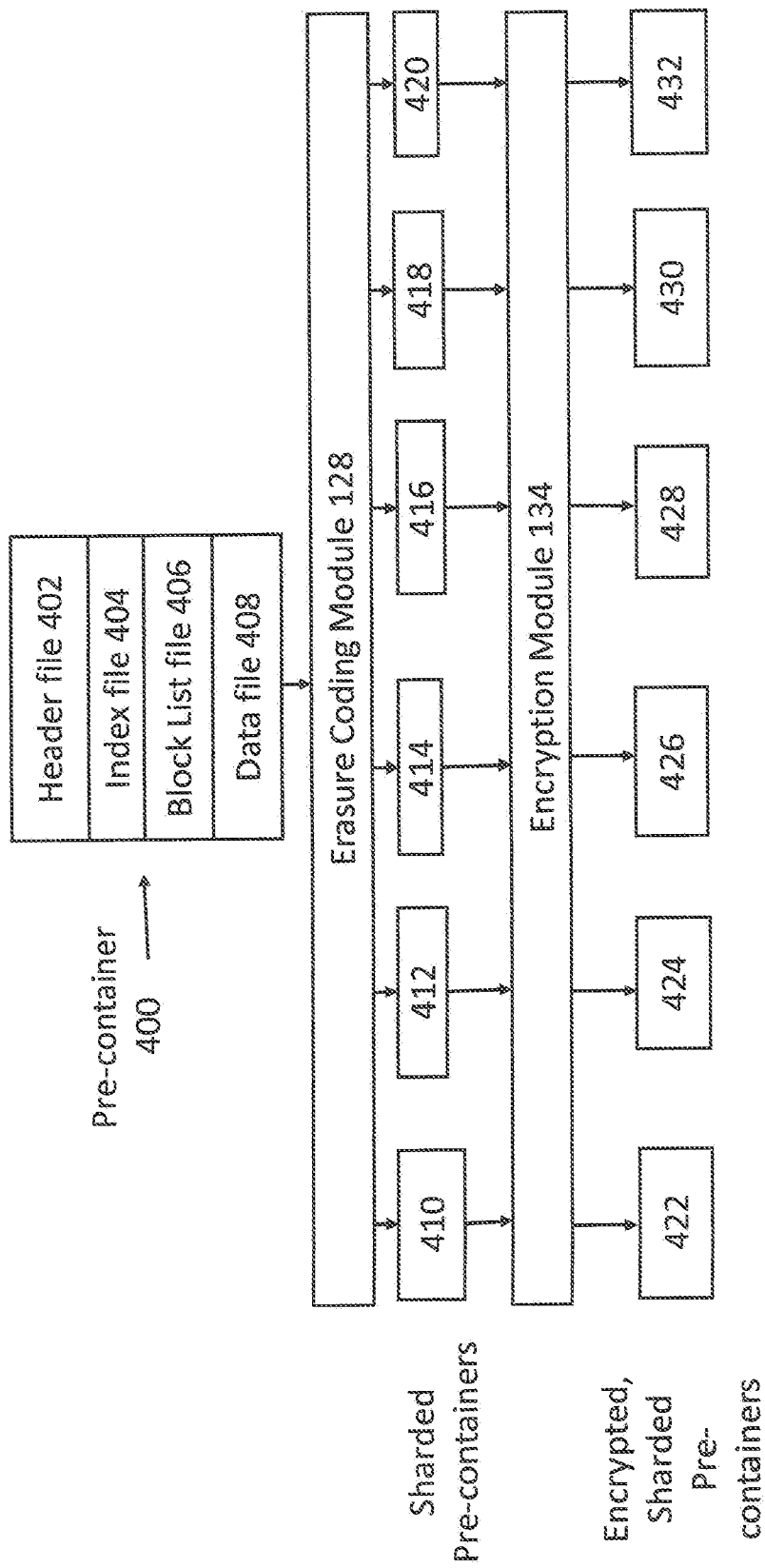
FIG. 5 is a schematic representation of sharding and encryption of a pre-container whose components are collected in the folder or temporary directory prior to containerization, in accordance with an embodiment of the invention.

FIG. 5 is a schematic representation of sharding and encryption of another pre-container 400 whose components are collected in the folder or temporary directory 222 prior to containerization, in accordance with an embodiment of the invention. The pre-container includes a Header file 402, an Index file 204, a Block List file 406, and one or more Data files 408, as in the pre-container 220 of FIG. 3. The pre-container 400 is shown being sharded into six (6) pre-containers 410, 412, 414, 416, 418, 420 by the erasure coding module 128. Each of the six (6) sharded pre-containers 410, 412, 414, 416, 418, 420 include a respective sharded Header file 402, a respective sharded Index file 404, a respective sharded Block List file 406, and a respective sharded Data file 408, which are not shown for ease of illustration. As discussed above, sharding may be performed by the erasure coding module 128 under the control of the processing device 130, the processing device 104, or the processing device 110 by implementing a Reed Solomon algorithm, for example. Each file in the pre-container 400 may be separately sharded or the pre-container as a whole can be sharded, for example.

While the pre-container 400 is shown in FIG. 5 as being provided to the erasure coding module 128 for sharding, the processing device 130, or another processing device in the VCL 102, such as the processing device 104 or the processing device 110, for example, may act on the pre-container to shard the pre-container while it is situated in a folder or temporary directory 222, for example, that is in another memory location.

The six (6) sharded pre-containers 410, 412, 414, 416, 418, 420 are each smaller than the pre-container 220 but in total are larger than the pre-container 400 prior to sharding due to redundancy in data in the six (6) pre-containers. The redundancy in data enables the pre-container 400 to be restored from fewer than all of the six (6) sharded pre-containers 410, 412, 414, 416, 418, 420, such as from any four (4) sharded pre-containers, for example. Each of the sharded pre-containers containers 410, 412, 414, 416, 418, 420 are then containerized, as discussed above with respect to FIG. 3.

The sharded pre-containers 410, 412, 414, 416, 418, 420 of FIG. 5 or the pre-container 220 of FIG. 3 may be encrypted. Encryption may be performed by the processing device 136 of the encryption module 134 of FIG. 2, for example, as shown schematically in FIG. 5. Whether a sharded pre-container 410, 412, 414, 416, 418, 420 or the pre-container 220 is to be encrypted or not encrypted may be determined by the client, for example. The client can provide instructions, such as whether a container should be encrypted, via an interface on a client device, when the client registers with the VCL 102 or at other times, for example.

In this example, the six (6) sharded pre-containers 410, 412, 414, 416, 418, 420 are each encrypted with the encryption key by the encryption module 134, as shown in FIG. 5. The sharded pre-containers 410, 412, 414, 416, 418, 420 may be encrypted with an encryption algorithm, such as AES 256, for example. While FIG. 5 shows the sharded pre-containers 410, 412, 414, 416, 418, 420 being passed to the encryption module 134 for processing by the processing device 136, encryption may be performed by the processing device 104, or the processing device 110, for example, while the sharded pre-containers are in the folder/temporary directory 222, for example.

As discussed above, an additional function that may be performed is providing a Checksum file containing a checksum for each sharded container 410, 412, 414, 416, 418, 420. The checksum file may also include a checksum routine or application to calculate the checksum of a respective sharded container 410, 412, 414, 416, 418, 420 and compare them to the previously calculated checksum in the checksum file, to verify that the contents of the containers have not been tampered with or damaged after creation or during archiving, for example. Another additional function that may be included is a self-destruct file for destroying the resulting VSC at a pre-determined time.

Figure 6:
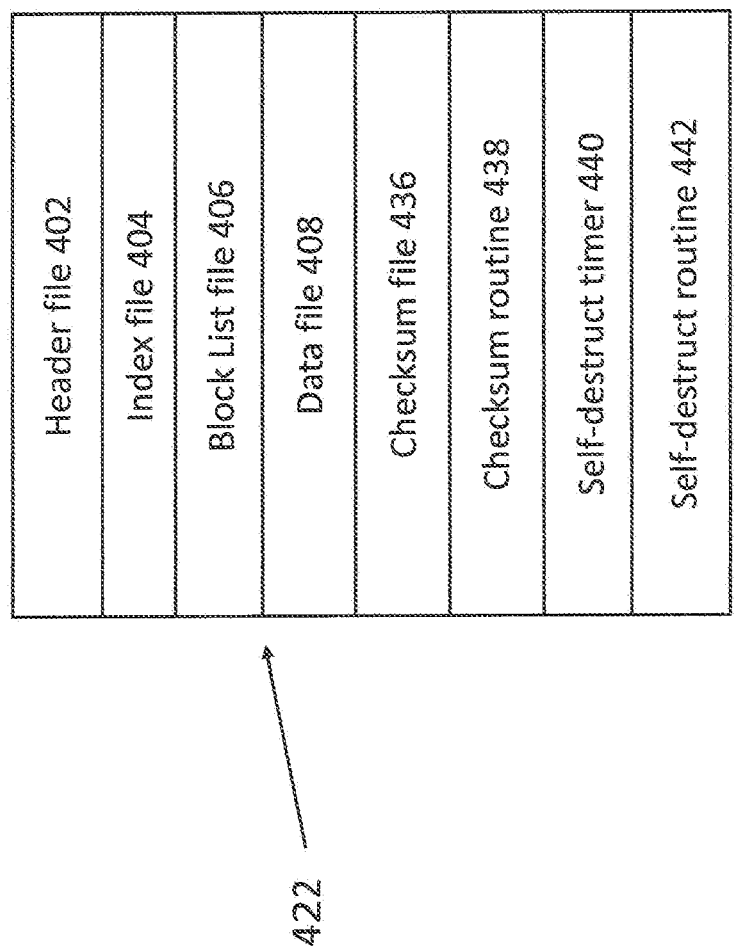
FIG. 6 is a schematic representation of another pre-container, in accordance with an embodiment of the invention.

FIG. 6 is a schematic representation of one of the encrypted, sharded pre-containers, here encrypted, sharded pre-container 422, for example, including a checksum file 436 with a checksum routine 438, a self-destruct timer 440.

and a self-destruct routine 442. The self-destruct timer 440 may also be provided in the Header file 402 instead of as a separate component as in FIG. 6. The pre-container 422 in this example also includes a Header file 402, an Index file 404, a block list file 406, and a Data file 408, as in the other encrypted, sharded pre-containers 424, 426, 428, 430, 432 of FIG. 5.

Checksums of archived data may be performed on the request of a user, according to a schedule established by the user's policies, and/or on reassembly of the original data, as discussed below, in accordance with embodiments of the invention. A user may provide a schedule via an interface on their client device 16A-16N during registration with the system and/or with a backup data stream, for example. When performed on an archived container at an archive location, the checksum of the data in the container would be calculated and compared to a checksum calculated when the container is being formed, by the executable checksum application or routine 438 shown in FIG. 6, for example. If a checksum verification of a VSC image fails, the archive location may notify the VCL 102. If the original data is still stored on the VCL 102, the VCL may generate another VSC image to replace the compromised VSC image. If the original data is no longer on the VCL, the processing device 104 or another processing device notes that the respective VSC image is compromised and should not be retrieved.

In this example, checksums are generated for each of the sharded, encrypted pre-containers 410, 412, 414, 416, 418, 420 of FIG. 6 by the checksum module 140, under the control of the processing device 142 or another processing device, such as the processing device 104 or 110, for example. If the sharded pre-containers 410, 412, 414, 416, 418, 420 of FIG. 5 are not encrypted, then the checksum is calculated for the non-encrypted sharded pre-containers 410, 412, 414, 416, 418, 420. Checksums may be calculated and the checksum file 436 associated with the respective pre-container when a respective encrypted, sharded pre-container is passed to the checksum module 140 or when the respective pre-container is in the folder/temporary directory 165, for example.

The checksums may be calculated in a manner known in the art for the entire pre-container 166 or for each file in the pre-container by the processing device 142 of the checksum module 140, the processing device 110, or the processing device 104, for example, while the pre-container is in the memory 144 of the checksum module 140, the storage 106, the memory 126 of the VSC generator module 122, or the storage 112 of the deduplication module 108, for example. Checksum routines are known in the art. The checksum may be calculated by a cyclic redundancy routine, for example.

The self-destruct timer 440 of FIG. 6 may similarly be added to the encrypted, sharded pre-container 422 by the processing device 104 or another processing device, for example, when the encrypted, sharded pre-container 422 is in the folder/temporary directory 165, for example. A client device 16A-16N may provide a time to destruction via an interface on their client device, upon registration with the system, or with a backup data stream, for example. The self-destruct routine 442 is run at a storage location. When the self-destruct timer 440 reaches a time designated in the container, a flag may be set in the container metadata by the self-destruct routine to indicate that the file is no longer a viable file. The container image will then no longer be provided in response to a request for data and/or may be purged depending on policies of the storage location.

Pre-containers, such as sharded pre-containers 410, 412, 414, 416, 418, 420, encrypted sharded pre-containers 422, 424, 426, 428, 430, 432, and encrypted sharded pre-containers including an added checksum file 436 and/or an added self-destruct timer 440, as in the encrypted, sharded pre-container 422 in FIG. 6, for example, are converted into respective VSCs images, such as the VSC image 230, as described above with respect to Step 310 of FIG. 4. The resulting VSC images may be stored in one or more archive storage locations in accordance with embodiments of the invention, such as local storage archive(s) 38 and/or cloud archive(s) 40 of FIG. 2.

Where a pre-container 400 is sharded, such as sharded into six (6) pre-containers, the resulting VSC images may be sent to different archive locations, including multiple cloud locations, for increased security, in accordance with embodiments of the invention, in a multi-cloud archive strategy. Since different storage locations have different egress fees, in accordance with embodiments of the invention, the necessary number of VSC images may be retrieved from the least expensive storage locations. Clients may select which archive locations sharded VSC images should be retrieved from via an interface on their client device 16A-16N during registration or at other times, for example. This information may be stored in the database. Alternatively, the VCL 102 may determine which archive locations to retrieve VSC images from, based on cost and other information collected from the storage locations by the VCL and stored in the database, for example. The client may authorize the VCL 102 to take such action, if desired.

Figure 7:
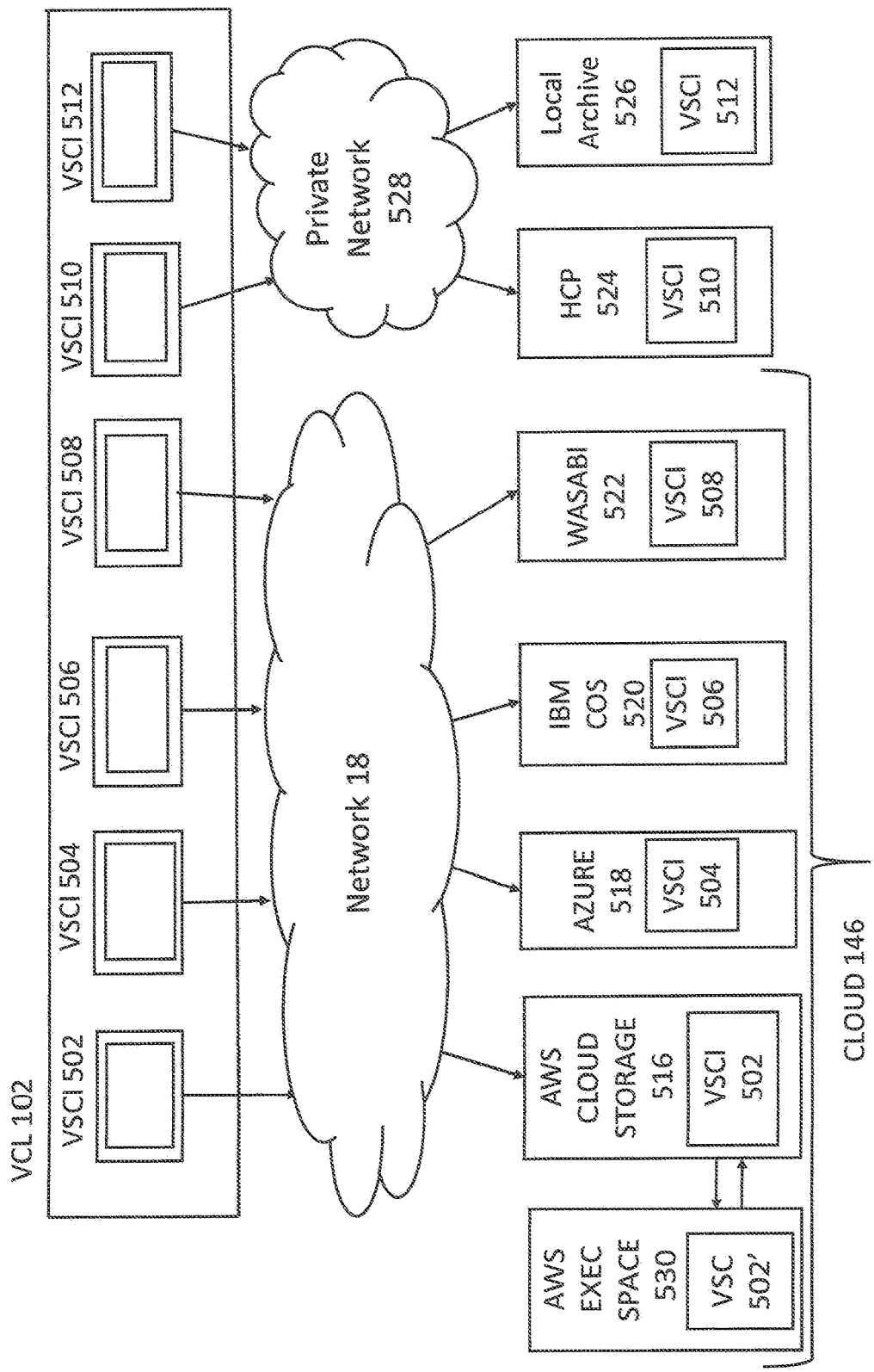
FIG. 7 is a schematic representation of the archiving of six (6) VSC images resulting from a sharded pre-container, in accordance with an embodiment of the invention.

FIG. 7 is a schematic representation of the archiving of six (6) VSC images 502, 504, 506, 508, 510, 512 resulting from sharded pre-containers, such as the sharded pre-containers 410, 412, 414, 416, 418, 420, respectively, (or the encrypted sharded pre-containers 422, 444, 426, 428, 420, 432, respectively, for example), generated by the VCL 102. The generated VSCs 502, 504, 506, 508, 510, 512 may be stored in storage, such as in the storage 106, the SSD 114, the HDD 116, in temporary folders or directories in a Linux file system containing the respective pre-containers, for example. The VSC images 502, 504, 506, 508, 510, 512 are shown surrounded by a box 514 to indicate that the respective pre-containers upon which they are based have been containerized. Each VSC image 502, 504, 506, 508, 510, 512 includes a Header file 402, an Index file 404, the Block list file 406, a Data file 408, and in this example the Checksum file 436 and the Self-destruct timer 440, as in the pre-container 422 of FIG. 6. The Header file 402, the Index file 404, the Block list file 406, the Data file 408, the Checksum file 436, and the Self-destruct timer 440 are not shown in the VSCs 502, 504, 506, 508, 510, 512 of FIG. 7 for ease of illustration.

Each VSC image ("VSCI") 502, 504, 506, 508, 510, 512 in the VCL 102 are shown being sent to a respective archive 516, 518, 520, 522, 524, 526 for long term storage via the network 18 and a private network 528. The transfer to the respective storage across the networks 18, 528 may be initiated by the processing device 104, for example. In the example of FIG. 7, the VSC image 502 is sent to Amazon Web Services (AWS) cloud storage 516, the VSC image 504 is sent to Azure cloud storage 518, the VSC image 506 is sent to the IBM Cloud Object Storage (COS) cloud platform 520, and the VSC image 508 is sent to the Wasabi cloud platform 522. Also, in this example, the VSC 510 is sent to the Hitachi Content Platform ("HCP") archive storage 524 and the VSC 512 is sent to the local archive 526 via a private network 528, such as a local area network (LAN). More than one VSC image may be stored in one or more of the cloud storage locations 502, 504, 506, 508, 510, and/or the local archive 512.

If a respective container image includes a checksum routine 438 and/or a self-destruct routine 442, the VSC image will need to be loaded from an archive location to a cloud execution space for execution of the routines, as is known in the art. The execution space includes one or more virtual processors and memory. In the example of the AWS cloud archive, the VSC image 502 may be stored in an AWS archive, such as AWS simple storage service (S3). When the checksum routine 438 and/or the self-destruct routine 442 need to be executed, the VSC image 502 may be copied to an execution space 530, such as AWS elastic compute cloud (E2) 530, for example. The execution space 530 may generate a VSC 502' from a VSC image with a "docker create" command, for example. Azure cloud storage 518 and IBM COS 524 also have associated cloud execution spaces, which would be similarly used to execute the checksum routine 438 and/or a self-destruct routine 442. Wasabi cloud storage 522 and HCP archive storage 524 may need to make other arrangements to execute stored files, such as to contract to use executable spaces of cloud storages that have execution spaces.

When a cloud archive or other archive runs the checksum routine 438 on a data file of a VSC image or an entire VSC image, the archive may inform the VCL 102 of the result. If the checksum of a respective sharded pre-container is not verified, then the storage archive may inform the VCL 102, which may note the information in the database discussed above, for example. In that case, when a client device 16A-16N requests the return of their data, the VCL 102 will not retrieve that VSC image to reconstruct the client's data. Similarly, when a cloud archive or other archive runs the self-destruct routine 442 and a time since creation of a VSC image matches or exceeds a stored time, the archive may inform the VCL 102, which may note in the database that the respective VSC image is not to be retrieved.

When the containerization process is a Docker containerization or other OCI compliant containerization, the container images will be able to be stored and executed in any cloud and non-cloud storge system. If the containerization process is not OCI compliant, the storage systems may need to be configured to store and execute the container. For example, a custom run-time environment may be required for running executable routines in the VSC image.

Figure 8:
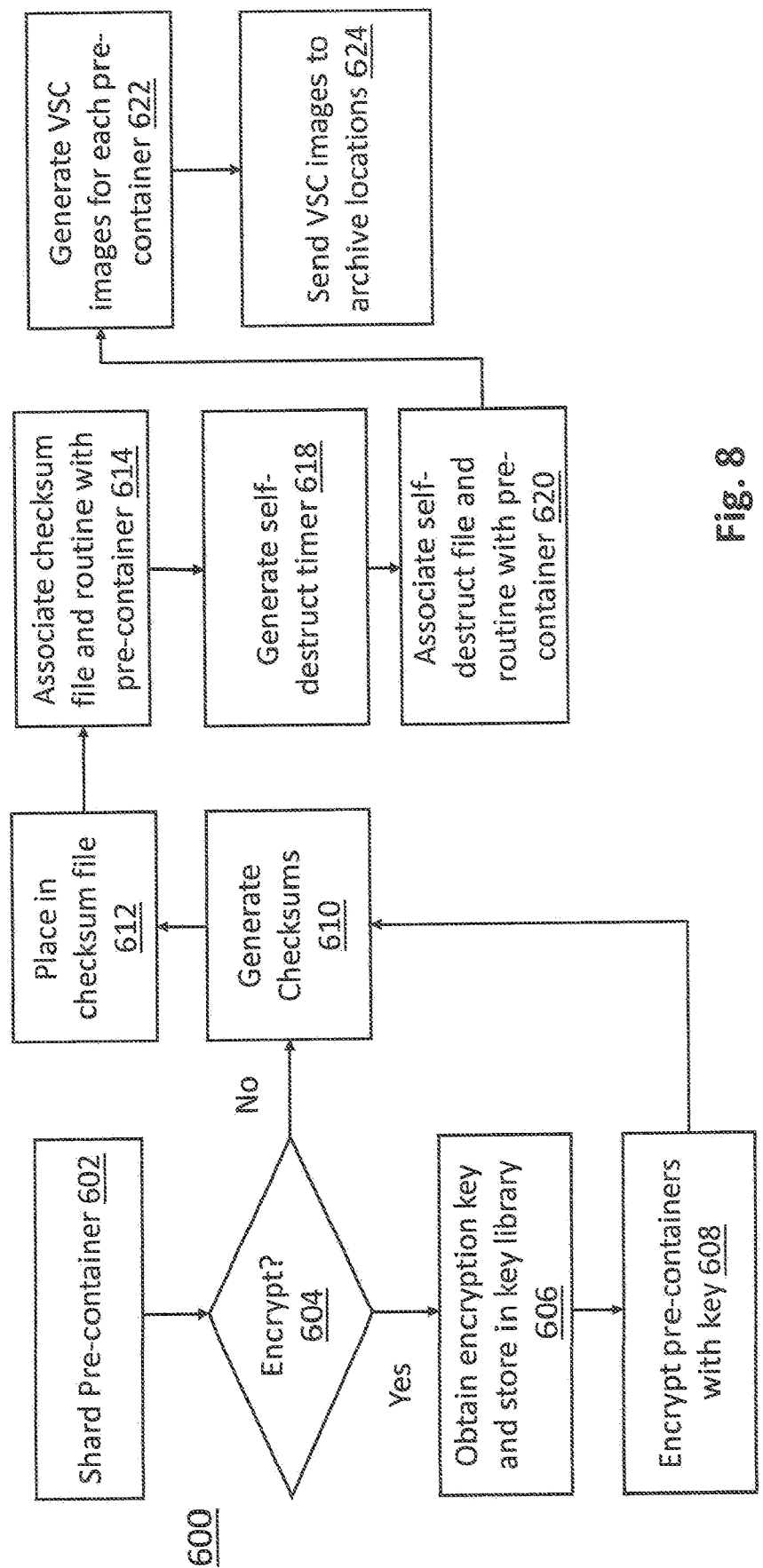
FIG. 8 is an example of a flowchart of a process for providing additional functions in a sharded pre-container, containerizing the pre-containers, and storing the pre-containers, in accordance with an embodiment of the invention.

FIG. 8 is an example of a flowchart 600 of a process for providing additional functions in a sharded pre-container, containerizing the pre-containers, and storing the pre-containers, in accordance with an embodiment of the invention. In FIG. 8, the pre-container is sharded and encrypted if desired by the client device. In addition, a checksum file and a self-destruct file are added. In other examples, adding a checksum file and/or a self-destruct file are options that may be selected by a client via an interface on their client device, during registration with the VCL 102 or at other times, for example. Client instructions may be stored in the database in the storage 106, for example. In this example, a pre-container is sharded into a plurality of pre-containers, in Step 602. The pre-container may be the pre-container 220 in the folder or temporary directory 222 shown in FIG. 3 and created in accordance with the process 300 of FIG. 4, for example. The pre-container may be sharded into a plurality of files by the erasure coding module 128, for example, as shown schematically in and described with respect to FIG. 5. The folder or temporary directory containing the pre-container 164 may be passed to the erasure coding module 128 or the erasure coding module may operate on the files in the VSC generator module 122 or wherever else the folder/temporary directory 222 is stored, for example. The plurality of files created by the erasure coding are placed in separate folders or temporary directories for further processing.

It is determined whether encryption is to be performed, in Step 604. As above, a client may select that encryption to be performed when their data is containerized via an interface on their client device, via an interface on their client device, during registration with the VCL 102 or at other times, for example. As above, the client instructions may be stored in the database in the storage 106, for example. If it is determined that encryption is to be performed (Yes in Step 604), then an encryption key is obtained and stored in Step 606. The encryption key may be generated by the VCL 102 or may be received from a client device 16A-16N, as discussed above. The sharded pre-containers are each encrypted, in Step 608. As discussed above, the sharded pre-containers may be encrypted with the key using an AES algorithm by the processing device 136 of the encryption module 134 or another processing device, such as the processing device 104, for example.

Checksums are generated for each of the encrypted pre-containers, in Step 610. If the pre-containers are not to be encrypted (No in Step 604), then checksums are generated for the sharded, non-encrypted pre-containers, also in Step 610. The generated checksums are placed in a checksum file, along with a checksum routine, in Step 612, and the checksum file is associated with other components of the pre-container, in Step 614. Checksums may be generated for each pre-container, placed in a checksum file, and associated with the other components of each pre-container by the processing device 142 of the checksum module 140 or another processing device, such as the processing device 104, for example. The checksum file for each pre-container may be associated with the other components of the pre-container in the temporary folder/directory 222, as discussed above.

A self-destruct timer 440 is generated, in Step 618, and associated with the other components of the pre-container, along with a self-destruct routine, in Step 620. The self-destruct timer 440 may be generated and associated with the other components of the pre-container by the processing device 104, for example. The self-destruct timer 440 for each pre-container may be associated with the other components of the pre-container in the temporary folder/directory 222, as discussed above. The sharded, encrypted pre-containers 422, 424, 426, 428, 430, 432, including their associated respective checksum files 436, are then compiled into respective VSC container images, in Step 622, in a manner described above with respect to Step 310 of FIG. 4, for example. The VSC images may be generated by the processing device 124 of the VSC generator module 122 or another processing device, such as the processing device 104, for example.

The VSC images are sent to archive locations for storage, in Step 624. Some of the VSC images may be sent to at least some of the archive storages, such as to cloud storage locations, by the processing device 104 via the network 18. Some of the VSC images may be sent to one or more local archives, by the processing device 104 via the network 18 or by direct connection, for example.

Since the data files that are to be containerized are sharded into multiple smaller containers before containerization, fewer than all of the archived containers need to be recovered and re-imported to the VCL 102 for restoration to the original application. In particular, in the example of FIG. 7, since the six (6) VSC container images 502, 504, 506, 508, 510, 512 were created as the result of sharding and containerizing the pre-container 400 in FIG. 5, the sharding and optionally encrypting the pre-container 400 in FIG. 5, or sharding and optionally encrypting the pre-container 442 of FIG. 6, for example, only four (4) of the VSC container images are needed to reconstruct the pre-container 400. The VCL 102 therefore has flexibility in which VSC images to retrieve to reconstruct original data. Since cloud storage is typically less expensive than local storage, and different cloud service providers charge different prices to retrieve archived data, in accordance with embodiments of the invention, the VCL 102 may select to retrieve the required number of VSC images necessary to reconstruct the original data from the storage locations having the lowest egress charges. Significant cost savings may therefore be achieved in a multi-cloud archive strategy.

In addition, in this example, the pre-container 400 may still be reconstructed even if one (1) or two (2) of the VSC images 502, 504, 506, 508, 510, 512 are damaged, lost, or corrupted, or the storage locations 516, 518, 520, 522, 524, 526 are damaged or suffer a disaster, for example. If the pre-container 400 is sharded into a different number of pre-containers, the respective pre-container can be reconstructed from a different number of VSC containers.

Archiving VSC container images resulting from sharding of the original pre-container 400 may therefore provide significant improvement in securing the data in the Data file(s) 408 of the pre-container 400. It is noted that if sharding is not provided, or if the original data stream provided for backup is too small to shard, then multiple copies of the container may be archived in different cloud and local storage locations to provide security against corruption of the VSC image or failure of an archive location, for example.

Since retrieval is required to perform data integrity audits of archived data, such audits may be expensive and time-consuming due to egress charges, long egress time to retrieve data from cloud storages, and the cost of traditional data validation programs. The cost and time required to conduct such audits may be significantly reduced using checksums in the VSC container images archived in a multi-cloud archive strategy, in accordance embodiments of the invention.

It is estimated that erasure coding of the containers could reduce storage costs of storing two or three copies of the same data by from about 50% to about 75%, for example. Reliability may be improved by an order of magnitude over archiving two or three copies of the same data. In addition, since the VSC containers may be moved to the multiple storage locations and recovered from the multiple locations in parallel, data export and recovery are faster than conventional archiving options.

Figure 9:
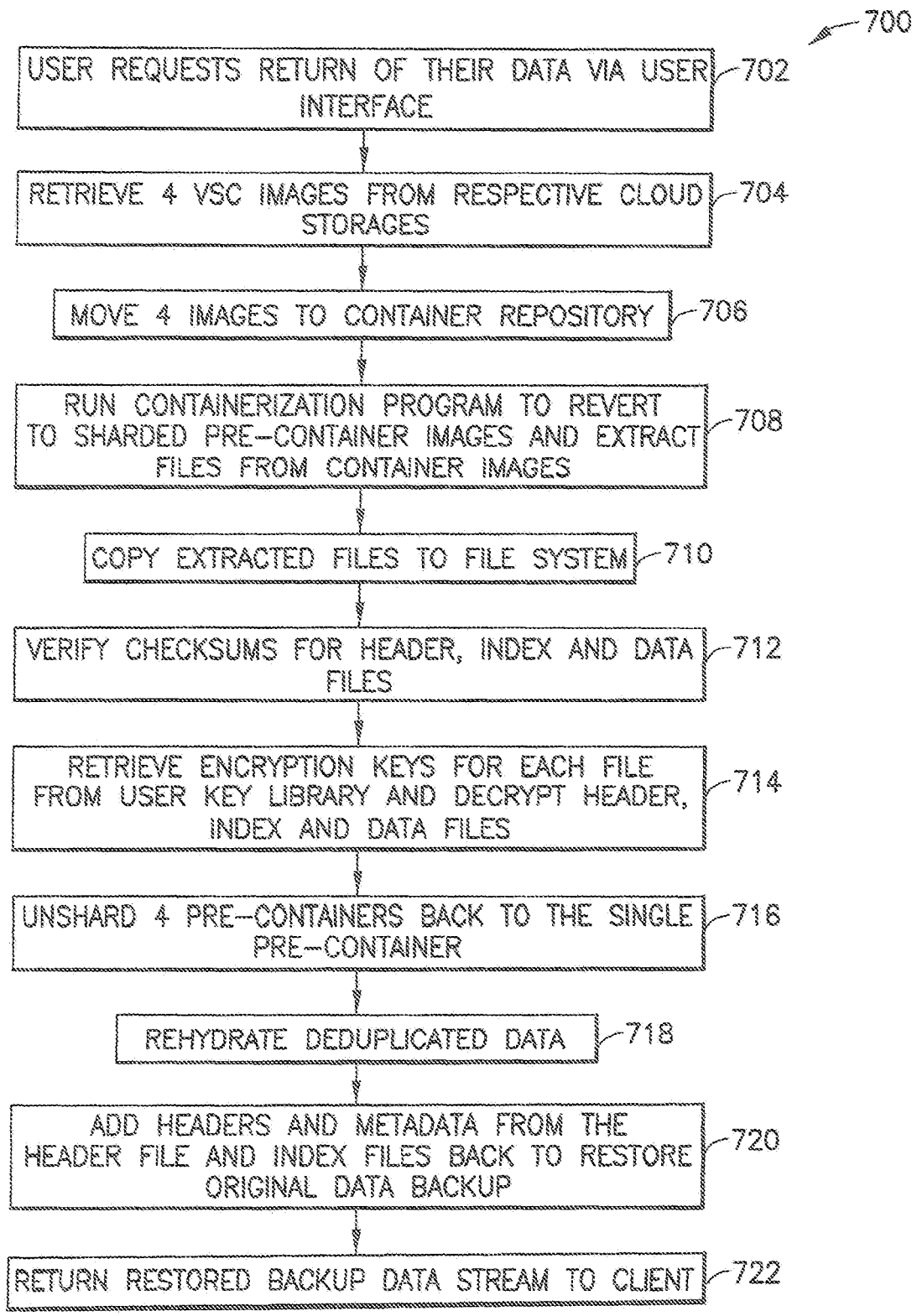
FIG. 9 is a flow chart of an example of a method of reconstructing a pre-container from a plurality of VSC images to reconstruct the original data, such as a backup data stream.

A pre-container may be reconstructed from the required number of VSC images by reversing the process of FIG. 8. FIG. 9 is a flow chart 700 of an example of a method of reconstructing a pre-container from a plurality of VSC images to reconstruct the original data, such as a backup data stream. A client device 16A-16N (see FIG. 1) requests return of the data that was sent to the VCL 102 via a user interface, in Step 702. In this example, since there were six (6) VSCs, only four (4) VSCs need to be retrieved. In this example, the four (4) VSCs are retrieved from four (4) of the archive storage locations, in Step 704. The four (4) respective cloud storages may be the four with the lowest egress fees, for example. In other examples, one or more of the four (4) needed VSC images may be retrieved from one or more local archives instead of or in addition to those retrieved from the cloud archive(s). The four (4) VSC images may be retrieved by the processing device 104 of the VCL 102, for example, by sending messages to the respective archive locations where the VSC images are stored, to send the VSC images to the VCL 102, via the network 18, for example.

The four (4) retrieved VSC images are moved into four (4) respective folders or temporary directories in memory of the VCL 102, referred to as a container repository, in Step 706. The container repository may be in the memory 126 of the VSC generator module 122, or other memory of the VCL 102, such as the memory 106, the SSD 110, and/or the HDD 112, for example.

In this example, the four (4) VSCs are based on encrypted, sharded pre-containers, such as the encrypted, sharded pre-containers 422, 424, 426, 428, in FIG. 5. The VSC images are reverted to encrypted, sharded pre-containers, such as the encrypted, sharded pre-containers 422, 424, 426, 428, by running the containerization program in a reversion mode, in Step 708. The processing device 124 of the VSC generator module 122, the processing device 104, or the processing device 110 can run the reversion process, for example.

The files in each of the sharded pre-containers, here the Header file 402, the Index file 404, the Block List file 406, and the Data file 408 in the VSC 502, are also extracted in Step 708 and copied to the folders or temporary directories in the file system, in Step 710.

In this example, the pre-containers include Checksum files 436. Checksums are verified for the Header 402, the Index file 404, the Block List file 406, and the Data file 408, in Step 712. The checksums may be verified by the processing device 142 of the checksum module 140, the processing device 104, or the processing device 110, for example. If the checksums are verified, the process goes to Step 714. If the checksum of a respective sharded pre-container is not verified, then another VSC image is retrieved from another cloud storage, reverted to a non-containerized form, and verified.

As noted above, in this example, the pre-containers are encrypted. In Step 714, the encryption key for the pre-containers is retrieved from the key library 135 and used to decrypt the pre-containers. The files may be decrypted by the processing device 136 of the encryption module 134, the processing device 104, or the processing device 110, for example. In this example, decrypting results in formation of the sharded pre-containers 410, 412, 414, 416.

The decrypted Header files 402, the Index files 404, the Block List 406, and the Data files 408 are unsharded, in Step 716. The files can be unsharded by the processing device 130 of the erasure coding module 128, the processing device 104, or the processing device 110, for example. The unsharding process recreates the original Header file 150, the original Index file 404, the original Block List file 406 and the original Data file(s) 408 of the original pre-container from which the four (4), sharded pre-containers are generated, and the pre-container is placed in another folder or temporary directory. In this example, the sharded pre-containers are unsharded into the pre-container 400 in FIG. 5.

The deduplicated data in the Data file(s) 408 is re-hydrated, in Step 718. The deduplicated data may be re-hydrated based on the data in the Index file 402 and the Block List file 404 of the pre-container 400, for example, by the processing device 106 of the deduplication module 104 or the processing device 104, for example.

Header information and metadata from the from the Header file 402 are added to the re-hydrated data to restore the original backup data stream, in Step 720. This may be performed by the processing device 110 of the deduplication module 108 or the processing device 104 of the VCL 102, for example. The restored backup stream is then returned to the requesting client device 16A-16N, via the network 18, in Step 722. After use, the folders or temporary directories may be deleted to free up space in the respective memory.

While the VCL 102 deduplicates backup data streams provided by client devices 16A-16N, deduplication and containerization of deduplicated data may also be performed on data resident on the client devices, in accordance with embodiments of the invention. In this case, during deduplication, stub files containing pointers to unique data blocks stored in the SIR 116 of the VCL 102 are provided on the client devices 16A-16N to replace redundant data. Deduplicated data in the SIR 116 may be processed and compiled to form container images in the same manner as described above for archiving. Containerization of data resident on a client device may also be performed without deduplicating the data, in accordance with embodiments of the invention.

As discussed above, functions relating to the operation of the VCL 102, including generation of VSC images in accordance with embodiments of the invention may be performed with the use of one or more processing devices. FIG. 2 is an example of a system incorporating respective processing devices 110, 124, 130, 136, and 142 to perform deduplication, VSC image generation, erasure coding, checksum calculation, and creation of a self-destruct file, respectively. FIG. 10 is an example of a functional block diagram of a processing device 800 corresponding to the processing device 104 or the processing device 110 of the VCL 102 of FIG. 2, which is configured to perform all the functions described above, in accordance with an embodiment of the invention. The processing device 300 may be a computer, a microprocessor, or another programmable data processing device, for example. Other configurations may be used instead.

The processing device 800 may include a central processing unit (CPU) 802, storage, such as a hard disk drive ("HDD") 804, and random-access memory ("RAM")/read only memory ("ROM") 806, which are connected to a system bus 808. A keyboard 810, a mouse 812 a display 814, and/or another communication interface 816 may be provided for use by an operator of the VCL 102.

A VCL program 818 is provided in this example to execute the various processes in a manner described herein. The VCL program 818 may be stored in a non-transitory computer readable storage medium, such as the HDD 804, for example.

The VCL program 818 may have various modules configured to perform the different functions described above. There may be an interaction module 820 that is operative to send and receive electronic data to and from various sources, such as backup data streams from client devices 16A-16N in FIG. 1, requests for data from the client devices, and rehydrated data to the client devices in response to the requests. The interaction module 820 is also operative to send containers to the physical tape 26, cloud archive(s) 40, and local archive(s) 38 shown in FIG. 2. The interaction module 820 may also send containers to the cloud storages 212-218 and local archives 220, 222 in FIG. 8, send requests for containers to respective storage locations, and receive containers in response to the requests.

A deduplication module 822 performs the functions of the deduplication module 108 of FIG. 2. A VSC generation module 824 performs the functions of the VSC generation module 122 of FIG. 2. A sharding module 826 performs the functions of the erasure coding module 128 of FIG. 2. The sharding module 826 may perform erasure coding, as described above with respect to the erasure coding module 128 or other sharding techniques. An encryption module 828 performs the functions of the encryption module 134 of FIG. 2. A checksum module 830 performs the functions of the checksum module 140 of FIG. 2.

Examples of implementations of embodiments of the invention are described above. Modifications may be made to those examples without departing from the spirit and scope of the invention, which is defined in the claims, below.

We claim:

1. A computer implemented method of storing data, comprising:
   storing deduplicated data in a first storage, by a processing device of a storage system;
   sharding the deduplicated data by the processing device into a first plurality of sharded deduplicated data files;
   containerizing, by the processing device, at least some of the sharded, deduplicated data files to form a second plurality of container images of sharded, deduplicated data, each container image being self-contained and configured to be moved and stored as a unit; and
   storing, by the processing device, the container images in at least one second storage different from the first storage.

2. The method of claim 1, comprising:
   containerizing the data into a container image by process meeting an Open Container Initiative ("OCI") specification.

3. The method of claim 2, wherein the OCI-compliant process is Dockerizing.

4. The method of claim 1, wherein, prior to storing the deduplicated data, the method further comprises:
   receiving a backup data stream from a source;
   deduplicating the backup data stream;
   storing the deduplicated data from the backup data stream in the first storage; and then
   sharding the deduplicated data.

5. The method of claim 4, further comprising:
   extracting block list data from a second storage, the block list data defining a map of the order of data blocks in the received backup data stream;
   extracting deduplicated data blocks identified in the block list data from the first storage;
   placing the deduplicated data blocks in a data file;
   generating an index table based the block list data and the extracted deduplicated data blocks, the index table data including offsets to pointers in the block list data to point to locations of respective deduplicated data blocks in the data file, wherein the backup data stream is reconstructable from the deduplicated data blocks based on the index table and the block list data; and
   containerizing the combination of the data file, the index table, and the block list data, in the storage location to form the container image.

6. The method of claim 1, further comprising:
   encrypting at least some of the second plurality of sharded, deduplicated data files; and
   containerizing at least some of the encrypted, sharded deduplicated data files to form the container images.

7. The method of claim 6, further comprising:
   creating a respective checksum file for at least some of the encrypted, sharded, deduplicated data files, each respective checksum file including a checksum for a respective encrypted, sharded deduplicated data file, for verifying the integrity of the respective encrypted, sharded, deduplicated data file;
associating the respective checksum file with a respective encrypted, sharded, deduplicated data file;
containerizing each encrypted, sharded, deduplicated data file, associated respective checksum file, and an associated checksum routine to form the respective container images.

8. The method of claim 6, further comprising:
associating a respective self-destruct timer with at least some of the encrypted files
associating a self-destruct routine with the encrypted, sharded, deduplicated data files having an associated self-destruct timer; and
containerizing each encrypted, sharded, deduplicated data file, associated self-destruct timer, and associated self-destruct routine to form the respective container images.

9. The method of claim 1, further comprising:
sending at least some of the container images to different respective storage cloud storage locations for storage, via a network;
retrieving a number of containers necessary to reconstruct the sharded deduplicated data from at least some of the different cloud storage locations;
reversing the containerization of each container image to retrieve the sharded deduplicated data;
unsharding the sharded deduplicated data in each retrieved container to reconstruct the deduplicated data; and
rehydrating the unsharded deduplicated data to reconstruct the data that the deduplicated data is based on.

10. The method of claim 9, wherein certain of the different cloud storage locations charge different egress fees, the method further comprising:
retrieving the number of container images necessary to reconstruct the deduplicated data from the cloud storage locations with the lowest egress fees.

11. The method of claim 10, further comprising:
retrieving the number of containers in response to a request by the source of the backup data stream; and
sending the reconstructed data to the requesting client machine.

12. The method of claim 9, wherein each container includes a checksum, the method further comprising:
performing a checksum on the deduplicated data prior to unsharding; and
if a checksum of one or more of the sharded deduplicated data does not match an expected checksum:
retrieving one or more other containers to replace each container with a checksum that does not match.

13. The method of claim 1, wherein the deduplicated data includes data ejected from a virtual tape library.

14. A system for storing data, comprising:
a storage system to store data; and
at least one processing device configured to:
store deduplicated data in a first storage, by a processing device of a storage system;
shard the extracted data into a plurality of sharded data files;
containerize the plurality of sharded data files to form container images of the respective plurality of sharded data files, each container image being self-contained and configured to be moved and stored as a unit; and
store the container images in at least one second storage different from the first storage;
the processing device being further configured to:
send at least some of the container images to different respective storage cloud storage locations for storage, via a network.

15. The system of claim 14, wherein the at least one processing device is configured to containerize the data by:
Dockerizing the data.

16. The system of claim 14, wherein the processing device is further configured to:
encrypt the at least some of the sharded data files prior to containerization; and
containerize the encrypted data files to form the respective container images.

17. The system of claim 14, wherein the processing device is further configured to:
create a respective checksum file for at least some of the sharded data files for verifying integrity of the sharded data files, the checksum file including a checksum of the sharded data files;
associate the respective checksum file with respective sharded data files;
associate a checksum routine with the sharded data files having an associated checksum file; and
containerize the sharded data files, associated checksum file, and associated checksum routine to form the plurality of container images.

18. The system of claim 14, wherein the processing device is further configured to, prior to containerization:
associate a self-destruct timer with at least some of the sharded data files;
associate a self-destruct routine with the sharded data files having an associated self-destruct timer; and
containerize the sharded data files, the associated self-destruct timer, and associated self-destruct routine to form are part of the respective container images.

19. The system of claim 14, wherein the processing device is configured to:
retrieve a number of containers necessary to reconstruct the sharded deduplicated data from at least some of the different cloud storage locations;
reverse the containerization of each container image to retrieve the sharded deduplicated data;
unshard the sharded deduplicated data in each retrieved container image to reconstruct the deduplicated data; and
rehydrate the unsharded deduplicated data to reconstruct the data that the deduplicated data is based on.

20. The system of claim 14, wherein certain of the different cloud storage locations charge different egress fees, the processing device being configured to:
retrieve a number of containers necessary to reconstruct the sharded data files from the cloud storage locations with the lowest egress fees.

21. The system of claim 20, wherein the processing device is further configured to:
perform a checksum on the sharded data files prior to unsharding; and
if a checksum of one or more of the sharded data files does not match an expected checksum:
retrieve one or more other containers to replace each container with a checksum that does not match.

22. A computer implemented method of storing data, comprising:
receiving a backup data stream from a source;
deduplicating the backup data stream;
storing deduplicated data from the backup data stream in a first storage;

extracting block list data from a second storage, the block list data defining a map of the order of data blocks in the received backup data stream;

extracting deduplicated data blocks identified in the block list data from the first storage;

placing the deduplicated data blocks in a data file;

generating an index table based the block list data and the extracted deduplicated data blocks, the index table data including offsets to pointers in the block list data to point to locations of respective deduplicated data blocks in the data file, wherein the backup data stream is reconstructable from the deduplicated data blocks based on the index table and the block list data; and containerizing a combination of the data file, the index table, and the block list data, in the storage location to form the container image.

23. A computer implemented method of storing data, comprising:

storing data in a first storage, by a processing device of a storage system;

sharding the data by the processing device into a first plurality of sharded data files;

containerizing, by the processing device, at least some of the sharded data files to form a second plurality of container images of sharded data, each container image being self-contained and configured to be moved and stored as a unit;

storing, by the processing device, the container images in at least one second storage different from the first storage; and sending at least some of the container images to different respective storage cloud storage locations for storage, via a network.

24. The method of claim 23, further comprising:

retrieving a number of containers necessary to reconstruct the sharded data from at least some of the different cloud storage locations;

reversing the containerization of each container image to retrieve the sharded data; and unsharding the sharded data in each retrieved container to reconstruct the data.

25. The method of claim 24, wherein certain of the different cloud storage locations charge different egress fees, the method further comprising:

retrieving the number of container images necessary to reconstruct the data from the cloud storage locations with the lowest egress fees.

26. The method of claim 24, further comprising:

retrieving the number of containers in response to a request by the source of the backup data stream; and sending the reconstructed data to the requesting client machine.

27. The method of claim 25, wherein each container includes a checksum, the method further comprising:

performing a checksum on the data prior to unsharding; and if a checksum of one or more of the sharded data does not match an expected checksum:

retrieving one or more other containers to replace each container with a checksum that does not match.

* * * * *